United States Patent
Nakatsukasa et al.

(10) Patent No.: US 12,214,452 B2
(45) Date of Patent: Feb. 4, 2025

(54) WELDING POWER SOURCE, WELDING SYSTEM, WELDING POWER SOURCE CONTROL METHOD, AND PROGRAM

(71) Applicant: Kobe Steel, Ltd., Kobe (JP)

(72) Inventors: Shogo Nakatsukasa, Kanagawa (JP); Hiroshi Hashimoto, Hyogo (JP); Yoshiaki Kitamura, Hyogo (JP); Ryo Toda, Hyogo (JP)

(73) Assignee: Kobe Steel, Ltd., Kobe (JP)

(*) Notice: Subject to any disclaimer, the term of this patent is extended or adjusted under 35 U.S.C. 154(b) by 974 days.

(21) Appl. No.: 17/278,519

(22) PCT Filed: Sep. 24, 2019

(86) PCT No.: PCT/JP2019/037404
§ 371 (c)(1),
(2) Date: Mar. 22, 2021

(87) PCT Pub. No.: WO2020/067074
PCT Pub. Date: Apr. 2, 2020

(65) Prior Publication Data
US 2022/0032388 A1 Feb. 3, 2022

(30) Foreign Application Priority Data
Sep. 26, 2018 (JP) .................................. 2018-180184

(51) Int. Cl.
*B23K 9/095* (2006.01)
*B23K 9/10* (2006.01)
(Continued)

(52) U.S. Cl.
CPC .......... *B23K 9/0953* (2013.01); *B23K 9/0956* (2013.01); *B23K 9/1062* (2013.01);
(Continued)

(58) Field of Classification Search
CPC ........ B23K 9/09; B23K 9/091; B23K 9/0953; B23K 9/0956; B23K 9/1062; B23K 9/124;
(Continued)

(56) References Cited

U.S. PATENT DOCUMENTS 9,012,808 B2 * 4/2015 Artelsmair ............. B23K 9/124
219/130.21
2007/0145028 A1 6/2007 Artelsmair
(Continued)

FOREIGN PATENT DOCUMENTS

EP 2 716 395 B1 4/2016
JP 60-180675 A 9/1985
(Continued)

OTHER PUBLICATIONS

International Search Report issued Dec. 3, 2019 in PCT/JP2019/037404, 5 pages.
(Continued)

*Primary Examiner* — Joe E Mills, Jr.
(74) *Attorney, Agent, or Firm* — Oblon, McClelland, Maier & Neustadt, L.L.P.

(57) ABSTRACT

A welding power source is configured to supply a welding current to a wire as a consumable electrode. The welding power source includes a controller configured to change the welding current based on a position of a distal end of the wire a distance from which to a surface of a base metal varies periodically, in a case where the distal end of the wire is fed toward the base metal with periodical switching between a forward feeding period and a reverse feeding period.

16 Claims, 9 Drawing Sheets

(51) Int. Cl.
*B23K 9/12* (2006.01)
*B23K 9/173* (2006.01)
*B25J 11/00* (2006.01)
*G05B 19/402* (2006.01)

(52) U.S. Cl.
CPC ............ *B23K 9/125* (2013.01); *G05B 19/402* (2013.01); *B23K 9/173* (2013.01); *B25J 11/00* (2013.01); *G05B 2219/45104* (2013.01); *G05B 2219/45135* (2013.01)

(58) Field of Classification Search
CPC .......... B23K 9/125; B23K 9/173; B25J 11/00; G05B 19/402; G05B 2219/45104; G05B 2219/45135
See application file for complete search history.

(56) References Cited

U.S. PATENT DOCUMENTS

| | | |
|---|---|---|
| 2010/0181296 A1 | 7/2010 | Ueda |
| 2012/0074114 A1 | 3/2012 | Kawamoto et al. |
| 2013/0068744 A1 | 3/2013 | Matsui et al. |
| 2013/0082040 A1 | 4/2013 | Kawamoto et al. |
| 2013/0082041 A1 | 4/2013 | Kawamoto et al. |
| 2016/0346864 A1* | 12/2016 | Matsui .................. B23K 9/092 |
| 2017/0036292 A1 | 2/2017 | Ide |

FOREIGN PATENT DOCUMENTS

| | | |
|---|---|---|
| JP | 2007-513779 A | 5/2007 |
| JP | 2010-167426 A | 8/2010 |
| JP | 2014-83553 A | 5/2014 |
| WO | WO 2010/146844 A1 | 12/2010 |
| WO | WO 2015/163101 A1 | 10/2015 |

OTHER PUBLICATIONS

Written Opinion of the International Searching Authority issued Dec. 3, 2019 in PCT/JP2019/037404, (with English translation), 10 pages.

Extended European Search Report issued Jun. 1, 2022 in European Patent Application No. 19865756.1, 8 pages.

* cited by examiner

FIG. 7

|  | Example of Related Art | Present Embodiment |
|---|---|---|
| Transfer Mode | Short-Circuit Transfer | Globular Transfer or Spray Transfer |
| Heat Input | Low | High |
| Appearance of Bead | Convex Shape | Flat |
| Penetration Depth | Small | Large |
| Welding Amount | Small | Large |
| Application | Thin Sheet (9 mm or less) | Medium-Thickness Plate (9 mm or more) |

FIG. 8

| | State | | | | |
|---|---|---|---|---|---|
| Event | A:T0~T1 | B:T1~T2 | C:T2~T3 | D:T3~T4 | E: Constant-Speed Feeding |
| Separation Occurred | To B | To E | To D | To A | Maintain |
| Separation Not Occurred | To B | To C | To D | To E | To B |

WELDING POWER SOURCE, WELDING SYSTEM, WELDING POWER SOURCE CONTROL METHOD, AND PROGRAM

TECHNICAL FIELD

The present invention relates to a welding power source, a welding system, and a method for controlling a welding power source, and a program.

BACKGROUND ART

Gas shielded arc welding is used for welding of automobiles, steel frames, construction machinery, shipbuilding, and various other industries, and in a construction field, further improvement of work efficiency is required. For example, reduction in spatter generation is required. This is because when the spatter adheres to a base metal (work), the work efficiency is reduced because removal work of the spatter or the like is needed.

As a common method effective for reducing spatter generation, there is a method of periodically repeating forward feeding and reverse feeding of a welding wire. This method is used for a short-circuit transfer mode in which a short-circuit state and an arc generation state are alternately repeated. Specifically, in the method, a distal end of a welding wire is brought into contact with a molten pool to cause a short circuit, and thereafter, the short circuit is stably released by a pinch force caused by a current and a pullback caused by reverse feeding, and droplets are forcibly transferred to the molten pool.

Examples of common techniques utilizing the above technique in the feeding of a welding wire include Patent Literatures 1 and 2.

Patent Literature 1 discloses that "In a welding method in which forward feeding and reverse feeding of a welding wire are periodically repeated, the stability of a welding state is improved. In an arc welding control method in which periodic repetition of forward feeding and reverse feeding of a welding wire at a feeding speed (Fw) is performed to generate short-circuit periods and arc periods, and during the arc periods, a first welding current (Iw1) is applied, and thereafter, a second welding current (Iw2) smaller than the first welding current (Iw1) is applied, a phase of the feeding speed (Fw) at a time point (t21) of transfer from an arc period to a short-circuit period is detected, and a value (Iw1) and/or an application period (Tw1) of the first welding current (Iw1) is changed depending on the detected phase. In this manner, fluctuation of the phase of the feeding speed due to outside disturbances during generation of short-circuit can be minimized, and therefore the stability of the welding states can be improved."

Patent Literature 2 discloses that "Provided is a pulse arc welding control method in which a peak current and a base current are repeatedly supplied in a pulsed manner between a welding wire and an object to be welded. In the method, during a predetermined period from a first time point in a peak current period to a second time point in a base current period, a feeding speed of the welding wire is lower than a feeding speed at a time point at which the peak current rises, or the feeding is reverse feeding in which the welding wire is fed in a direction away from the object to be welded. In this manner, an arc length is reduced and short circuit at the time of separation of droplets is prevented."

CITATION LIST

Patent Literature

Patent Literature 1: WO 2015/163101 A1
Patent Literature 2: JP 2014-83553 A

SUMMARY OF INVENTION

Technical Problem

The technique described in Patent Literature 1 is directed to a control method involving a short circuit, and although it can achieve reduction of spatter generation, an applicable current range is inevitably generally low due to the property that the transfer mode of droplet transfer is short-circuit transfer. For this reason, the technique described in Patent Literature 1 is suitable for welding of a thin sheet for which low heat input welding is preferred, but is not suitable for welding of a thick plate for which high heat input welding is preferred because a certain amount of penetration cannot be ensured. That is, in a case where the technique described in Patent Literature 1 is applied to the welding of a thick plate, there is a problem in that an appearance of a bead becomes a convex shape in addition to the occurrence of insufficient penetration due to insufficient heat input. Specifically, even if the technique described in Patent Literature 1, in which an upper limit of applicable welding current is limited, is applied to a thick structure, not only welding efficiency is poor due to a small welding amount, but also welding quality cannot be sufficiently ensured due to low heat input.

In addition, the technique described in Patent Literature 2 only describes that a command value of a feeding speed for feeding a wire reversely is controlled in a separation prediction period defined based on a periodical change of a pulse current, and does not describe any condition for realizing stable separation. In other words, a condition for realizing stable prevention of spatter is not described.

An object of the present invention is to efficiently perform welding with high heat input, and to achieve reduction of spatter generation even in the case of a high current range in which a transfer mode other than short-circuit transfer is adopted, in an arc welding method in which forward feeding and reverse feeding of a distal end of the wire that is a consumable electrode are periodically repeated.

Solution to Problem

Based on such an option, the present invention provides a welding power source configured to supply a welding current to a wire as a consumable electrode, the welding power source including a control unit configured to change the welding current based on a position of a distal end of the wire a distance from which to a surface of a base metal varies periodically, in a case where the distal end of the wire is fed toward the base metal with periodical switching between a forward feeding period and a reverse feeding period.

Here, the control unit may determine the position of the distal end of the wire based on a command value of a feeding speed of the wire.

In a case where the distal end of the wire that varies periodically is positioned between a position defined by ½ of a wave height defined by an upper point and lower point of a variation range and a position closer to the base metal than the position defined by ½ of the wave height, the control unit may start a low-current period during which the welding current is lower than a predetermined current value.

The low-current period may be started within a range that is from a position of the distal end of the wire at a time point at which a period during which the distal end of the wire is fed forward is switched to a period during which the distal end of the wire is fed reversely to a position of the distal end of the wire at a time point at which a command value of the feeding speed of the wire switched to reverse feeding becomes maximum. Alternatively, the low-current period may be started within a range that is from a point where the distal end of the wire is positioned at the lowermost point of the variation range to a point where a position of the distal end of the wire reaches the position defined by ½ of the wave height.

Further, the low-current period may be ended within a range that is from a position of the distal end of the wire at a time point at which a command value of the feeding speed of the wire switched to reverse feeding becomes maximum to a position of the distal end of the wire at a time point at which a period during which the distal end of the wire is fed reversely is switched to a period during which the distal end of the wire is fed forward. Alternatively, the low-current period may be ended within a range that is from a point where the distal end of the wire is positioned at the position defined by ½ of the wave height to a point where the distal end of the wire reaches the uppermost point of the variation range.

Here, a timing of the start of the low-current period may be corrected based on a phase difference between the command value of the feeding speed of the wire and an actually measured feeding speed of the wire, and a timing of the end of the low-current period may be corrected based on a phase difference between the command value of the feeding speed of the wire and an actually measured feeding speed of the wire.

The welding current may have a pulse waveform in which a first period during which a current larger than an average value thereof flows and a second period during which a current smaller than the average value flows are periodically repeated, and the low-current period may correspond to the second period, and a period other than the low-current period may correspond to the first period.

Here, a rising transition period may be provided between an end point of the second period and a start point of the first period, and a falling transition period may be provided between an end point of the first period and a start point of the second period. The welding current in the rising transition period may change stepwise.

The welding power source may further includes a detection unit configured to detect separation of the wire from the base metal, and in a case where the separation of the wire is not detected by the detection unit during a period during which the distal end of the wire is fed reversely, the control unit may start control to cause the wire to be fed at a predetermined constant speed after an end of the period during which the distal end of the wire is fed reversely, and in a case where the separation of the wire is detected by the detection unit during a period during which the wire is fed at a constant speed, the control unit may switch the control to an initial condition in which the period during which the distal end of the wire is fed forward and the period during which the distal end of the wire is fed reversely are periodically repeated.

The welding power source may further include a detection unit configured to detect separation of the wire from the base metal, and in a case where the separation of the wire is detected by the detection unit during a period from a time point, at which a command value of a feeding speed of the wire becomes maximum, in a period during which the distal end of the wire is fed forward to a time point of switching to a period during which the distal end of the wire is fed reversely, the control unit may start control to cause the wire to be fed at a predetermined constant speed at a time point at which the period during which the distal end of the wire is fed reversely is switched to the period during which the distal end of the wire is fed forward, and in a case where the separation of the wire is detected by the detection unit during a period during which the wire is fed at a constant speed, the control unit may switch the control to an initial condition in which the period during which the distal end of the wire is fed forward and the period during which the distal end of the wire is fed reversely are periodically repeated.

The present invention further provides a welding system configured to supply a welding current to a wire as a consumable electrode to perform arc welding, the welding system including a control unit configured to change the welding current based on a position of a distal end of the wire a distance from which to a surface of a base metal varies periodically, in a case where the distal end of the wire is fed toward the base metal with periodical switching between a forward feeding period and a reverse feeding period.

The present invention further provides a method for controlling a welding power source configured to supply a welding current to a wire as a consumable electrode, the method including changing the welding current based on a position of a distal end of the wire a distance from which to a surface of a base metal varies periodically, in a case where the distal end of the wire is fed toward the base metal with periodical switching between a forward feeding period and a reverse feeding period.

The present invention further provides a program causing a computer in a welding system configured to supply a welding current to a wire as a consumable electrode to perform arc welding, to execute a function of changing the welding current based on a position of a distal end of the wire a distance from which to a surface of a base metal varies periodically, in a case where the distal end of the wire is fed toward the base metal with periodical switching between a forward feeding period and a reverse feeding period.

Advantageous Effects of Invention

In the present invention, in an arc welding method in which forward feeding and reverse feeding of a distal end of the wire that is a consumable electrode are periodically repeated, welding can be efficiently performed with high heat input, and reduction of spatter generation can be achieved even in the case of a high current range in which a transfer mode other than a short-circuit transfer is adopted.

BRIEF DESCRIPTION OF DRAWINGS

FIG. 7 is an illustrative diagram showing features of a control method of changing a welding current based on a position of a distal end of a welding wire.

FIG. 8 is an illustrative diagram showing a relation between transitions of events in each of a case where there is a separation and a case where there is no separation.

DESCRIPTION OF EMBODIMENTS

Figure 1:
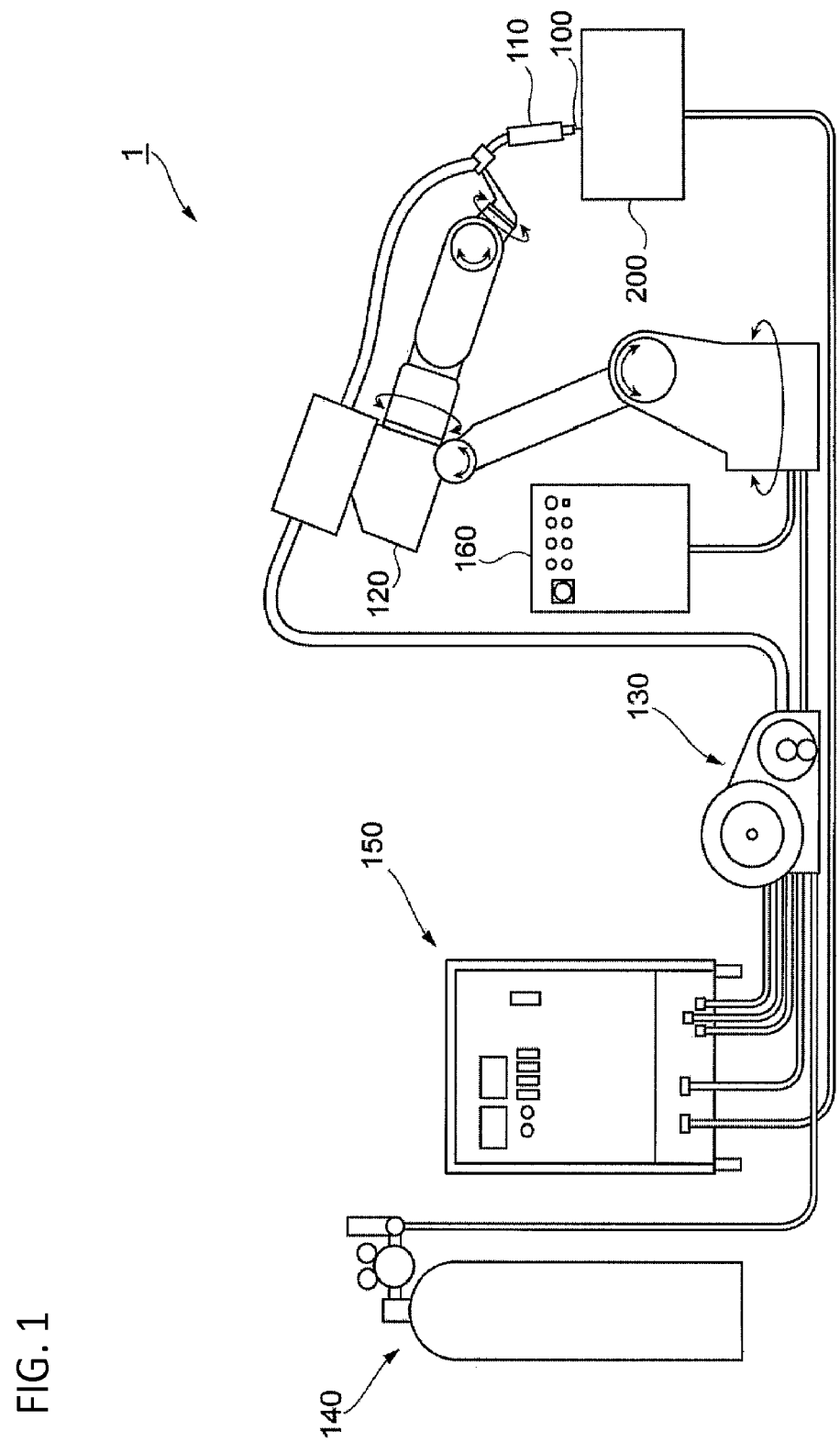
FIG. 1 is a configuration diagram showing an arc welding system in the present embodiment.

Hereinafter, examples of embodiments of a welding power source, a welding system, a method for controlling a welding power source, and a program in the present invention are described with reference to the accompanying drawings. It should be noted that the drawings have been made for the description of the present invention, and the embodiments of the present invention are not limited to the contents shown in the drawings.

<Overall Configuration of System>

FIG. 1 is a configuration diagram showing an arc welding system 1 in the present embodiment.

The arc welding system 1 includes a welding robot 120, a robot controller 160, a welding power source 150, a feeding device 130, and a shielding gas supply device 140.

The welding power source 150 is connected to a welding electrode via a positive power cable, and is connected to an object to be welded (hereinafter, also referred to as a "base metal" or a "work") 200 via a negative power cable. The above connection is used for a case where welding is performed with negative polarity. In a case where welding is performed with positive polarity, the welding power source 150 is connected to the base metal 200 via a positive power cable, and is connected to the welding electrode via a negative power cable.

Further, the welding power source 150 and the feeding device 130 of a consumable electrode (hereinafter, also referred to as a "welding wire") 100 are connected by a signal line, and a feeding speed of the welding wire can be controlled.

The welding robot 120 includes a welding torch 110 as an end effector. The welding torch 110 includes an energization mechanism (contact tip) for energizing the welding wire 100. The welding wire 100 generates an arc from a distal end thereof by energization from the contact tip, and welds, by the heat, the base metal 200 to be welded.

Further, the welding torch 110 includes a shielding gas nozzle including a mechanism for ejecting shielding gas. The shielding gas may be any of carbon dioxide gas and mixed gas such as mixed gas of argon gas and carbon dioxide gas ($CO_2$). The carbon dioxide gas is more preferable, and in the case of the mixed gas, a mixed gas in which 10% to 30% of carbon dioxide gas is mixed with Ar gas is preferable. The shielding gas is supplied from the shielding gas supply device 140.

The welding wire 100 used in the present embodiment may be either a solid wire that does not contain a flux or a flux-cored wire that contains a flux. The welding wire 100 may be made of any material. The material of the welding wire 100 may be, for example, mild steel, or may be stainless steel, aluminum, or titanium. Further, a diameter of the welding wire 100 is not particularly limited. In the present embodiment, the upper limit of the diameter of the welding wire 100 is preferably set to 1.6 mm, and the lower limit thereof is preferably set to 0.8 mm.

The robot controller 160 controls operation of the welding robot 120. The robot controller 160 stores teaching data in which an operation pattern of the welding robot 120, a welding start position, a welding end position, a welding condition, weaving operation, and the like have been determined in advance, and gives the instruction about them to the welding robot 120 to control the operation of the welding robot 120. In addition, the robot controller 160 outputs a command for controlling the power source during welding work to the welding power source 150 based on the teaching data.

The arc welding system 1 herein is an example of a welding system. The welding power source 150 is also an example of a control unit for changing the welding current.

<Configuration of Welding Power Source>

Figure 2:
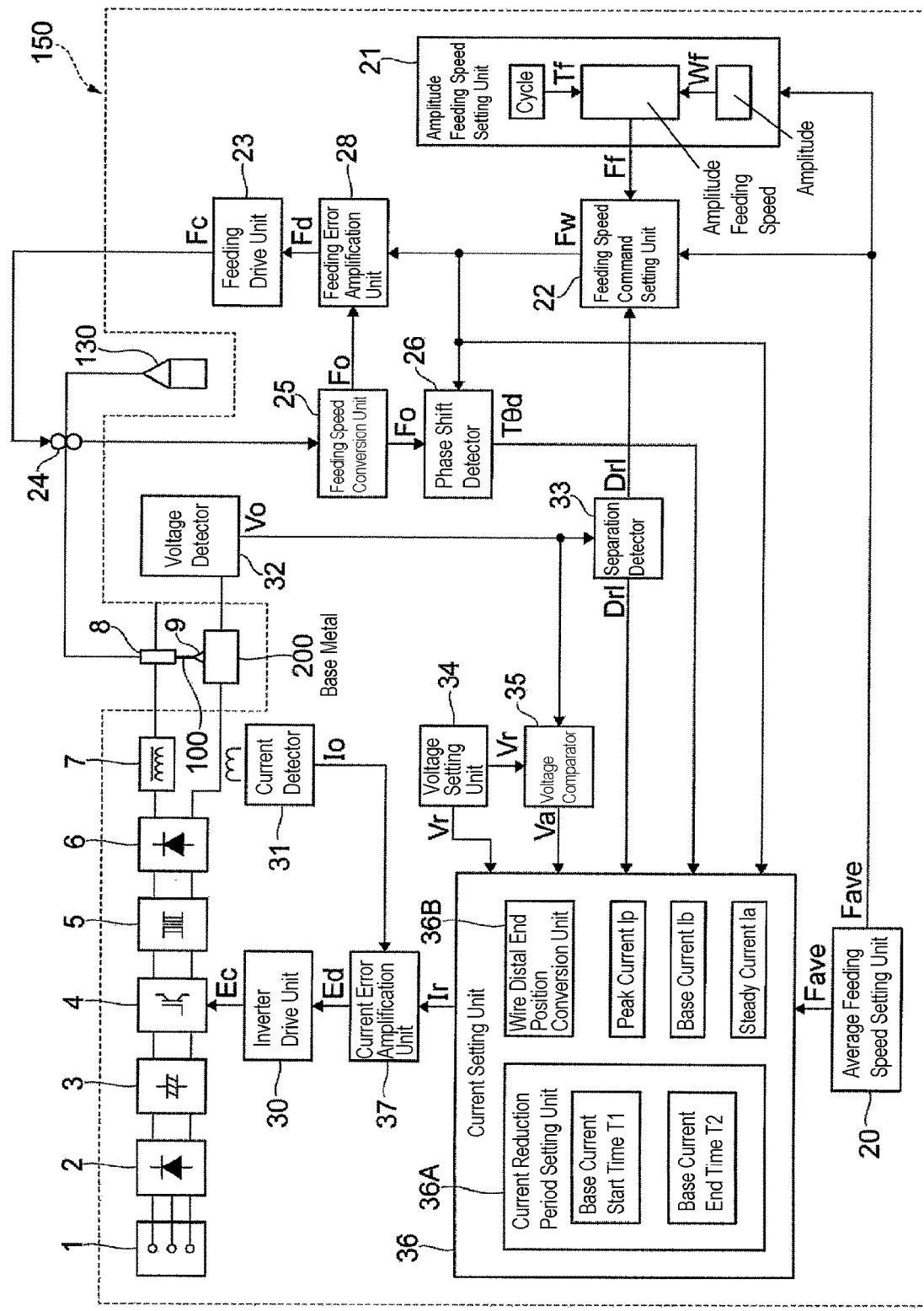
FIG. 2 is a block configuration diagram for explaining a configuration example of a control system part of a welding power source.

FIG. 2 is a block configuration diagram for explaining a configuration example of a control system part of a welding power source 150.

The control system part of the welding power source 150 is executed through, for example, execution of a program of a computer.

The control system part of the welding power source 150 includes a current setting unit 36. The current setting unit 36 in the present embodiment has a function of setting various current values that define a welding current flowing through the welding wire 100, and a function (current reduction period setting unit 36A) of setting time when a period during which a current value of the welding current is reduced starts and time when the above period ends. The current setting unit 36 includes a wire distal end position conversion unit 36B that obtains information on a position of a distal end of the welding wire 100.

In the case of the present embodiment, the welding current is a pulse current, and the current setting unit 36 sets a peak current Ip, a base current Ib, and a steady current Ia for droplet separation. In the case of the present embodiment, the welding current is basically controlled by two values, i.e., the peak current Ip and the base current Ib. Therefore, time t1 when the period during which the current value is reduced starts represents time when the base current Ib starts (base current start time), and time t2 when the period during which the current value is reduced ends represents time when the base current Ib ends (base current end time).

A power source main circuit of the welding power source 150 includes an alternating current (AC) power source 1, a primary-side rectifier 2, a smoothing capacitor 3, a switching element 4, a transformer 5, a secondary-side rectifier 6, and a reactor 7. The AC power source 1 herein is a three-phase alternating current power source.

Alternating current (AC) power output from the AC power source 1 is full-wave rectified by the primary-side rectifier 2, further smoothed by the smoothing capacitor 3, and converted into direct current (DC) power. Next, the DC power is converted into high-frequency AC power by inverter control performed by the switching element 4, and then converted into secondary-side power via the transformer 5. The AC output from the transformer 5 is full-wave rectified by the secondary-side rectifier 6, and further smoothed by the reactor 7. A current output from the reactor 7 is supplied to a welding tip 8 as an output from the power source main circuit, and energizes the welding wire 100 as a consumable electrode.

The welding wire 100 is fed by a feeding motor 24 and generates an arc 9 between the welding wire 100 and the base metal 200. In the case of the present embodiment, the feeding motor 24 feeds the welding wire 100 such that a forward feeding period during which the distal end of the welding wire 100 is fed to the base metal 200 at a speed higher than an average speed thereof and a reverse feeding period during which the distal end of the welding wire 100 is fed to the base metal 200 at a speed lower than the average speed are periodically switched. The distal end of the welding wire 100 during the reverse feeding period moves in a direction away from the base metal 200.

Feeding of the welding wire 100, which is performed by the feeding motor 24, is controlled by a control signal Fc from a feeding drive unit 23. An average value of the feeding speed is substantially the same as a melting speed. In the case of the present embodiment, the feeding of the welding wire 100, which is performed by the feeding motor 24, is also controlled by the welding power source 150.

A target value of a voltage applied between the welding tip 8 and the base metal 200 (voltage setting signal Vr) is output from a voltage setting unit 34 to the current setting unit 36.

The voltage setting signal Vr herein is also output to a voltage comparator 35 and is compared with a voltage detection signal Vo detected by a voltage detector 32. The voltage detection signal Vo is an actually measured value.

The voltage comparator 35 amplifies a difference between the voltage setting signal Vr and the voltage detection signal Vo, and outputs the amplified difference to the current setting unit 36 as a voltage error amplification signal Va.

The current setting unit 36 controls the welding current such that a length of the arc 9 (that is, the arc length) is constant. In other words, the current setting unit 36 executes the constant voltage control through the control of the welding current.

Based on the voltage setting signal Vr and the voltage error amplification signal Va, the current setting unit 36 resets a value of the peak current Ip, a value of the base current Ib, and a period during which the peak current Ip is supplied, or magnitudes of the value of the peak current Ip and the value of the base current Ib, and outputs a current setting signal Ir corresponding to the reset period or magnitudes of the values to a current error amplification unit 37.

In the case of the present embodiment, the period during which the peak current Ip is supplied is a period other than a period during which the base current Ib is supplied. In other words, the period during which the peak current Ip is applied is a period during which the current is not reduced (current non-reduction period). The period during which the peak current Ip is supplied is an example of a first period.

On the other hand, the period during which the base current Ib is applied is also referred to as a current reduction period. The current reduction period is an example of a low-current period and is also an example of a second period.

The current error amplification unit 37 amplifies a difference between the current setting signal Ir output as a target value and a current detection signal Io detected by a current detector 31, and outputs the amplified difference as a current error amplification signal Ed to an inverter drive unit 30.

The inverter drive unit 30 corrects a drive signal Ec in the switching element 4 based on the current error amplification signal Ed.

A signal (separation detection signal Dr1) that detects separation of droplets from the distal end of the welding wire 100 is also input to the current setting unit 36. The separation detection signal Dr1 is output from a separation detector 33. The separation detector 33 monitors a change in the voltage detection signal Vo output from the voltage detector 32, and detects separation of droplets from the welding wire 100 based on the change. The separation detector 33 is an example of a detection unit.

The separation detector 33 herein detects the separation of the droplets by, for example, comparing a value obtained by differentiating or second-order differentiating the voltage detection signal Vo with a threshold value for detection. The threshold value for detection has been stored in advance in a storage unit (not shown).

The separation detector 33 may generate the separation detection signal Dr1 based on a change in a resistance value calculated from the voltage detection signal Vo, which are actually measured values, and the current detection signal Io.

An average feeding speed Fave of the welding wire 100 to be fed is also output to the current setting unit 36. An average feeding speed setting unit 20 outputs the average feeding speed Fave based on teaching data stored in the storage unit (not shown).

The current setting unit 36 determines, based on the output average feeding speed Fave, a value of the peak current Ip, a value of the base current Ib, a value of the steady current Ia, a value of the time t1 when the base current Ib starts, and a value of the time t2 when the base current Ib ends.

The average feeding speed Fave is input to the current setting unit 36 as shown in FIG. 2 in the present embodiment, and as to a signal input to the current setting unit 36, a value related to the average feeding speed Fave may be used as a setting value in place of the average feeding speed Fave. For example, in a case where the average feeding speed and a database of an average current value at which optimal welding is enabled in relation to the average feeding speed are stored in the storage unit (not shown), the average current value may be used as a setting value in replace of the average feeding speed Fave.

The average feeding speed Fave is also output to an amplitude feeding speed setting unit 21 and a feeding speed command setting unit 22.

The amplitude feeding speed setting unit 21 herein determines a value of an amplitude Wf and a value of a cycle Tf based on the input average feeding speed Fave. The amplitude feeding refers to a feeding method in which a period during which a feeding speed is higher than the average feeding speed Fave (forward feeding period) and a period during which the feeding speed is lower than the average feeding speed Fave (reverse feeding period) alternately appear. The amplitude Wf gives a variation width to the average feeding speed Fave, and the cycle Tf gives a time of an amplitude change that is a repeating unit. The amplitude feeding speed setting unit 21 generates and outputs an amplitude feeding speed Ff corresponding to the determined values of the amplitude Wf and the cycle Tf.

The feeding speed command setting unit 22 outputs a feeding speed command signal Fw based on the amplitude feeding speed Ff and the average feeding speed Fave.

In the case of the present embodiment, the feeding speed command signal Fw is represented by the following equation.

$$Fw=Ff+Fave \qquad \text{Equation 1}$$

Here, the feeding speed command signal Fw represented by Equation 1 is only applicable to a case where the separation of the droplets from the distal end of the welding wire 100 is detected within an assumed period.

In a case where the separation of the droplets is not detected within the assumed period, the feeding speed command setting unit 22 switches the feeding speed command signal Fw to control of feeding based on a constant speed. For example, the feeding speed command signal Fw is switched to the feeding based on the average feeding speed Fave. The switching from the feeding based on the average feeding speed Fave to the feeding control represented by Equation 1 is determined depending on a timing at which the separation of the droplets is detected. A specific control example is described below.

The feeding speed command setting unit 22 detects, based on the separation detection signal Dr1 output from the separation detector 33, a specific phase of amplitude feeding at which the separation has occurred.

The feeding speed command signal Fw is output to a phase shift detector 26, a feeding error amplification unit 28, and the current setting unit 36.

The feeding error amplification unit 28 amplifies a difference between the feeding speed command signal Fw, which is a target speed, and a feeding speed detection signal Fo obtained by actually measuring a feeding speed of the welding wire 100 fed by the feeding motor 24, and outputs a speed error amplification signal Fd obtained by correcting an erroneous difference to the feeding drive unit 23.

The feeding drive unit 23 generates a control signal Fc based on the speed error amplification signal Fd and outputs the control signal Fc to the feeding motor 24.

A feeding speed conversion unit 25 herein converts a rotation amount of the feeding motor 24 or the like into the feeding speed detection signal Fo of the welding wire 100.

The phase shift detector 26 in the present embodiment compares the feeding speed command signal Fw with the feeding speed detection signal Fo that is a measured value, and outputs a phase shift time (phase difference) Tθd. The phase shift detector 26 may determine the phase shift time Tθd by measuring feeding operation of the feeding motor 24 in a case where the parameters (the cycle Tf, the amplitude Wf, and the average feeding speed Fave) defining the amplitude feeding are variable.

The phase shift time Tθd is input to the wire distal end position conversion unit 36B of the current setting unit 36. The wire distal end position conversion unit 36B calculates a position of the distal end of the welding wire 100, at which the base metal 200 is used as a reference plane, based on the feeding speed command signal Fw and the phase shift time Tθd, and outputs calculated information on the position of the distal end to the current reduction period setting unit 36A.

Here, the current reduction period setting unit 36A sets a period during which the welding current is reduced, that is, a period during which the current setting signal Ir is controlled to the base current Ib, based on the information on the position of the distal end of the welding wire 100, or based on the information on the position of the distal end of the welding wire 100 and the feeding speed command signal Fw.

The current setting unit 36 herein is an example of a control unit that changes a welding current based on the position of the distal end of the welding wire 100.

<Example of Control of Welding Current>

Hereinafter, an example of control of a welding current generated by the welding power source 150 is described.

The control of the welding current is implemented by the current setting unit 36 of the welding power source 150. As described above, the current setting unit 36 in the present embodiment implements control through execution of a program.

The current setting unit 36 in the present embodiment controls switching of a current value of the welding current based on the feeding speed command signal Fw of the welding wire 100 and the information on the position of the distal end of the welding wire 100. Therefore, prior to the description of the control of the welding current, a temporal change of the feeding speed command signal Fw and a temporal change of the position of the distal end of the welding wire 100 are described.

Figure 3:
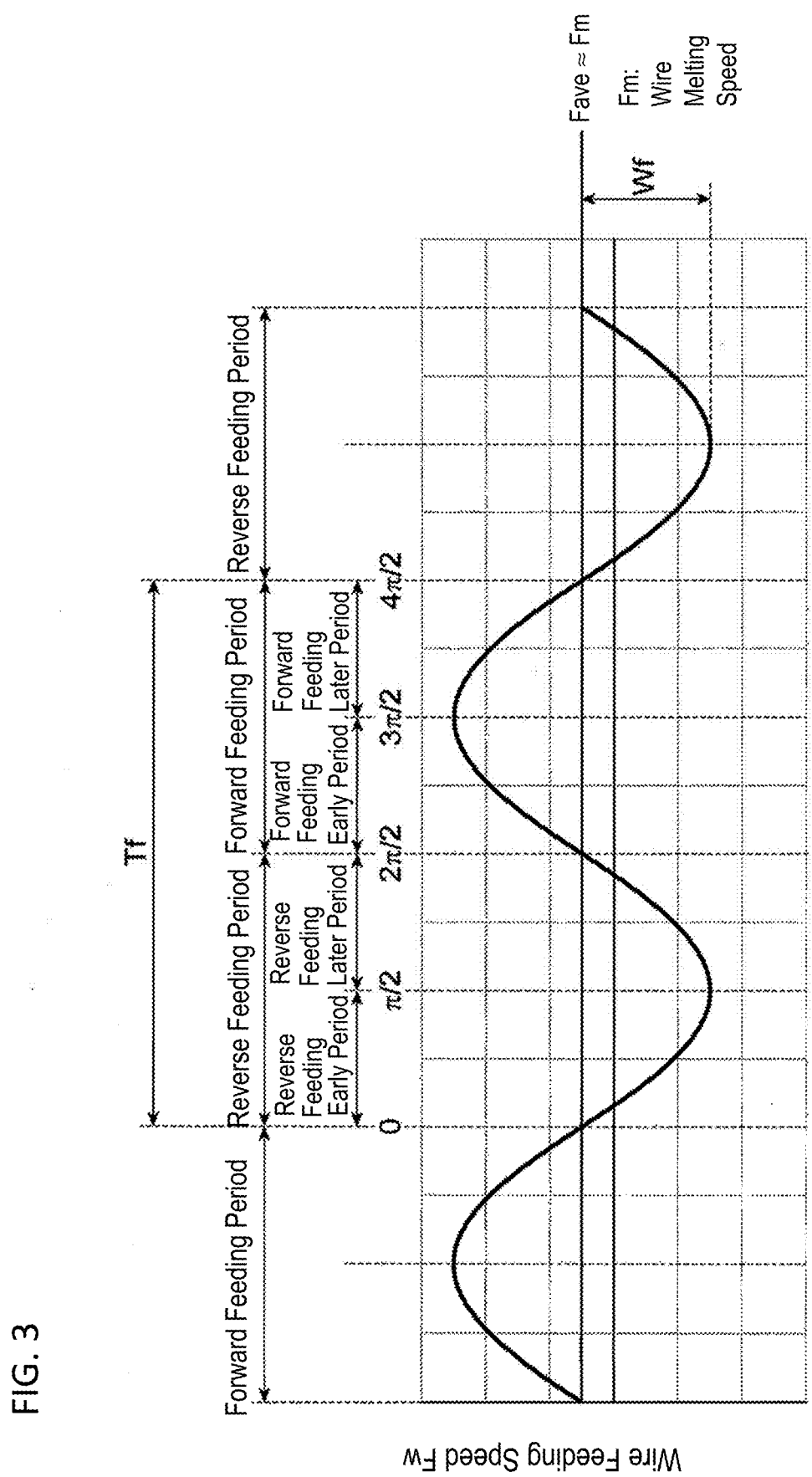
FIG. 3 is a waveform diagram for explaining a temporal change of a wire feeding speed.

FIG. 3 is a waveform diagram for explaining the temporal change of the feeding speed command signal Fw. The horizontal axis represents time (phase), and the vertical axis represents speed. The unit of the vertical axis is meter per minute or rotation speed. In this case, the numerical values are merely examples. For example, in a case where a diameter of the welding wire 100 (see FIG. 2) is 1.2 mm, the average feeding speed Fave is 12 to 25 meters per minute. However, in order to maintain globular transfer or spray transfer, which is described below, the feeding speed is desired to be eight meters per minute although it depends on the electrode extension of the welding wire 100. For example, in a case where an electrode extension of the welding wire 100 is 25 mm, a value of the welding current is about 225 A. A critical region between the short-circuit transfer and the globular transfer is about 250 A.

In FIG. 3, a speed higher than the average feeding speed Fave is represented by a positive value, and a speed lower than the average feeding speed Fave is represented by a negative value. The welding wire 100 (see FIG. 2) is sent out so as to approach the base metal 200 (see FIG. 2).

In the case of the present embodiment, the feeding speed command signal Fw changes in a sinusoidal waveform defined by the cycle Tf and the amplitude Wf. Hereinafter, a period during which the feeding speed is higher than the average feeding speed Fave is referred to as a forward feeding period, and a period during which the feeding speed is lower than the average feeding speed Fave is referred to as a reverse feeding period. Further, for convenience of explanation, the first half of each feeding period is referred to as an early period, and the second half is referred to as a later period.

The average feeding speed Fave can be regarded as a wire melting speed Fm.

Hereinafter, as shown in FIG. 3, the amplitude feeding in which the forward feeding period and the reverse feeding period are periodically repeated may be referred to as an initial condition.

Figure 4:
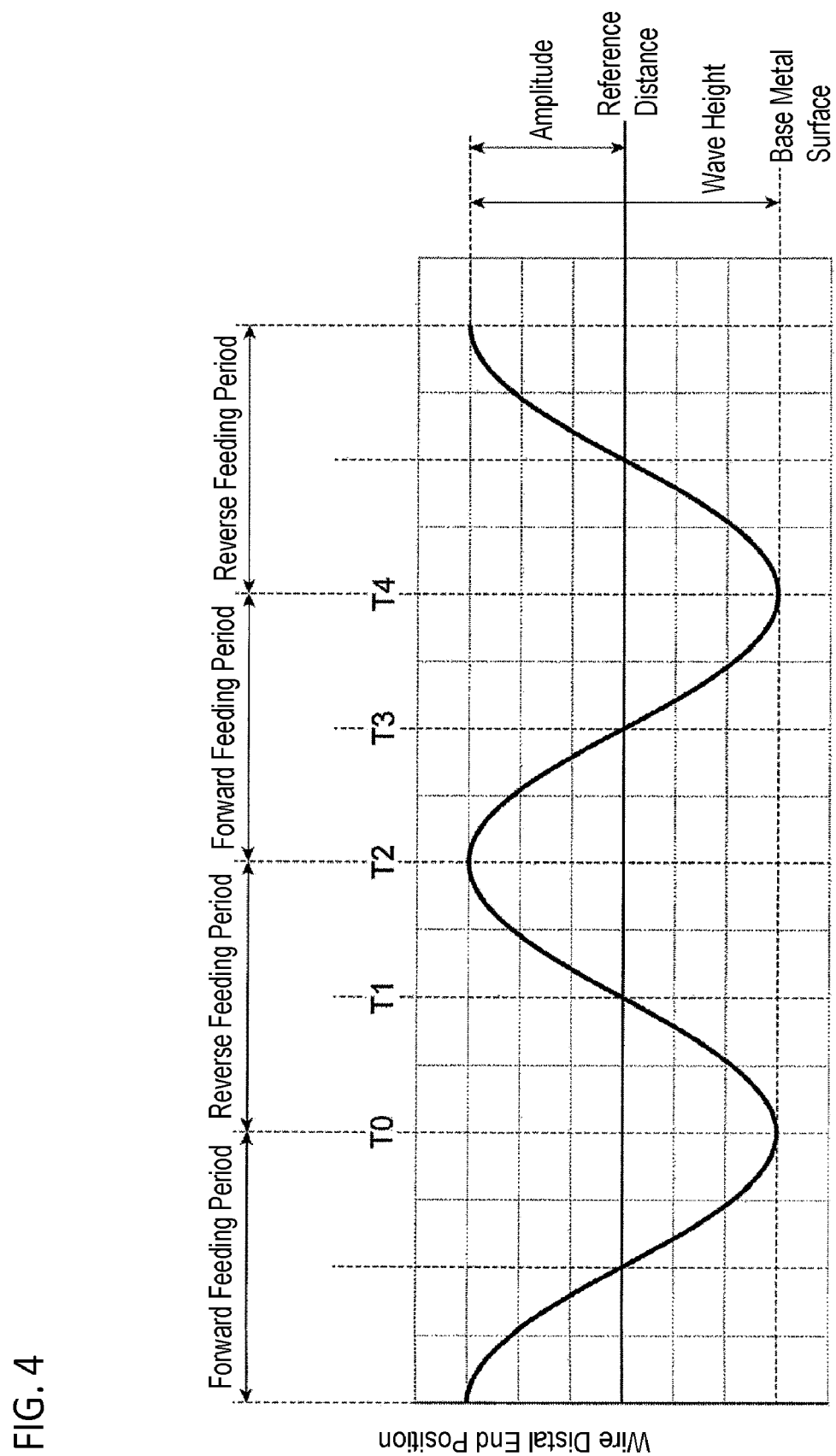
FIG. 4 is a waveform diagram for explaining a temporal change of a position of a distal end of a welding wire.

FIG. 4 is a waveform diagram for explaining a temporal change of the position of the distal end of the welding wire 100 (see FIG. 2) (a position of a wire distal end). The horizontal axis represents time (phase), and the vertical axis represents a distance (height) upward in a normal direction from a surface of the base metal 200 (a base metal surface).

In FIG. 4 here, when a distance (height) in a case where the welding wire 100 is fed at the average feeding speed Fave is defined as a reference distance, a distance larger than the reference distance is represented by a positive value, and a distance smaller than the reference distance is represented by a negative value.

As shown in FIG. 4, a period during which the position of the distal end of the welding wire 100 approaches the surface of the base metal with the lapse of time is a forward feeding period, and a period during which the position of the distal end of the welding wire 100 moves away from the surface of the base metal with the lapse of time is a reverse feeding period.

In FIG. 4, time points corresponding to positions (lowermost point) where the position of the distal end of the welding wire 100 is closest to the surface of the base metal are represented by T0 and T4, and a time point corresponding to a position (vertex) where the position of the distal end of the welding wire 100 is farthest from the surface of the base metal is represented by T2. The vertex herein is an example of an uppermost point.

Time points corresponding to the reference distance are defined as T1 and T3. T1 is an intermediate time point at which the position of the distal end of the welding wire 100 moves from a position (lowermost point) closest to the surface of the base metal toward a position (vertex) farthest from the surface of the base metal. T3 is an intermediate time point at which the position of the distal end of the welding wire 100 moves from a position farthest from the surface of the base metal to a position closest to the surface of the base metal. As shown in FIG. 4, a difference between the position of the distal end of the welding wire 100 and the average feeding speed Fave is the amplitude. In addition, a variation width of the position of the distal end of the welding wire 100 that periodically varies, that is, a variation width defined by upper and lower points within a variation range of the position of the distal end, is a wave height.

Figure 5:
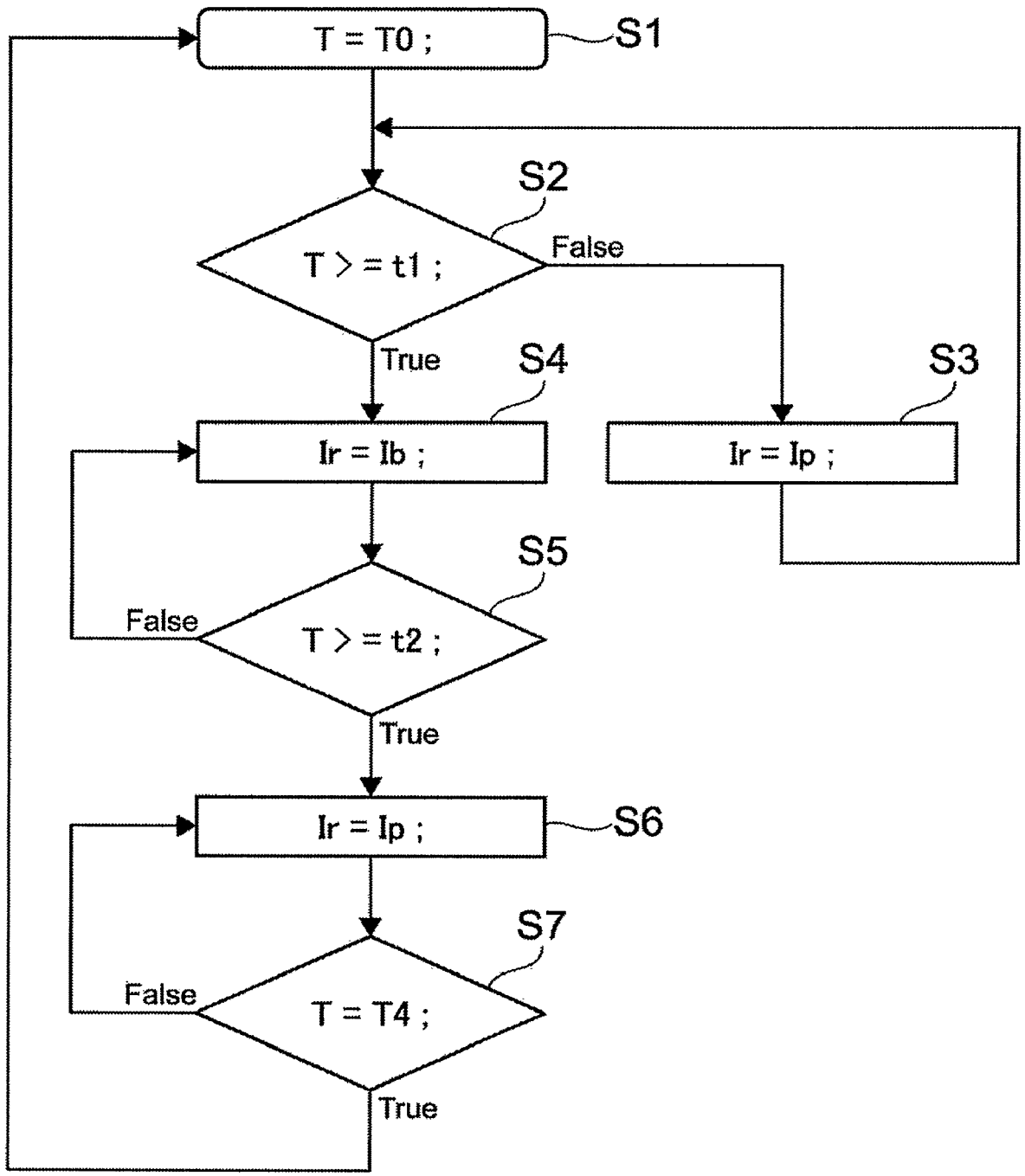
FIG. 5 is a flowchart for explaining an example of control of a welding current in the present embodiment.

FIG. 5 is a flowchart for explaining an example of control of a welding current in the present embodiment. The control shown in FIG. 5 is executed in the current setting unit 36 (see FIG. 2). The symbol S in the drawing denotes a step.

The control shown in FIG. 5 corresponds to a change (one cycle) in the position of the distal end of the welding wire 100. Therefore, a state in which time T is the time point T0 is referred to as step 1 in FIG. 5.

The current setting unit 36 in the present embodiment calculates a position of the distal end of the welding wire 100 for controlling the current setting signal Ir.

The average feeding speed Fave is equal to the wire melting speed Fm. Therefore, when differences between the feeding speed command signal Fw and the wire melting speed Fm (approximately equal to Fave) are integrated, the position of the distal end of the welding wire 100 can be determined.

The current setting unit 36 sets the position of the distal end of the welding wire 100 based on the following equation.

$$\text{Position of wire distal end} = \int (Fw - Fave) \cdot dt \quad \text{Equation 2}$$

The change of the position of the distal end calculated by Equation 2 corresponds to FIG. 4.

However, when the feeding motor 24 (see FIG. 2) is used to feed the welding wire 100, a phase shift may occur between a command and an actual feeding speed, that is, the feeding speed detection signal Fo. Then, the current setting unit 36 corrects, based on the phase shift time Tθd output from the phase shift detector 26, the base current start time t1 calculated based on the position of the distal end of the welding wire 100 calculated from the average feeding speed Fave and the feeding speed command signal Fw. Specifically, a value of the base current start time t1 is reset as shown in the following equation.

$$t1 = t1 + T\theta d \quad \text{Equation 3}$$

Similarly, the current setting unit 36 corrects, based on the phase shift time Tθd, the base current end time t2 calculated from the average feeding speed Fave and the feeding speed command signal Fw.

$$t2 = t2 + T\theta d \quad \text{Equation 4}$$

Here, the case where the base current start time t1 and the base current end time t2 are controlled from the viewpoint of the feeding speed is described, but the same applies to the viewpoint of the position control.

Figure 6:
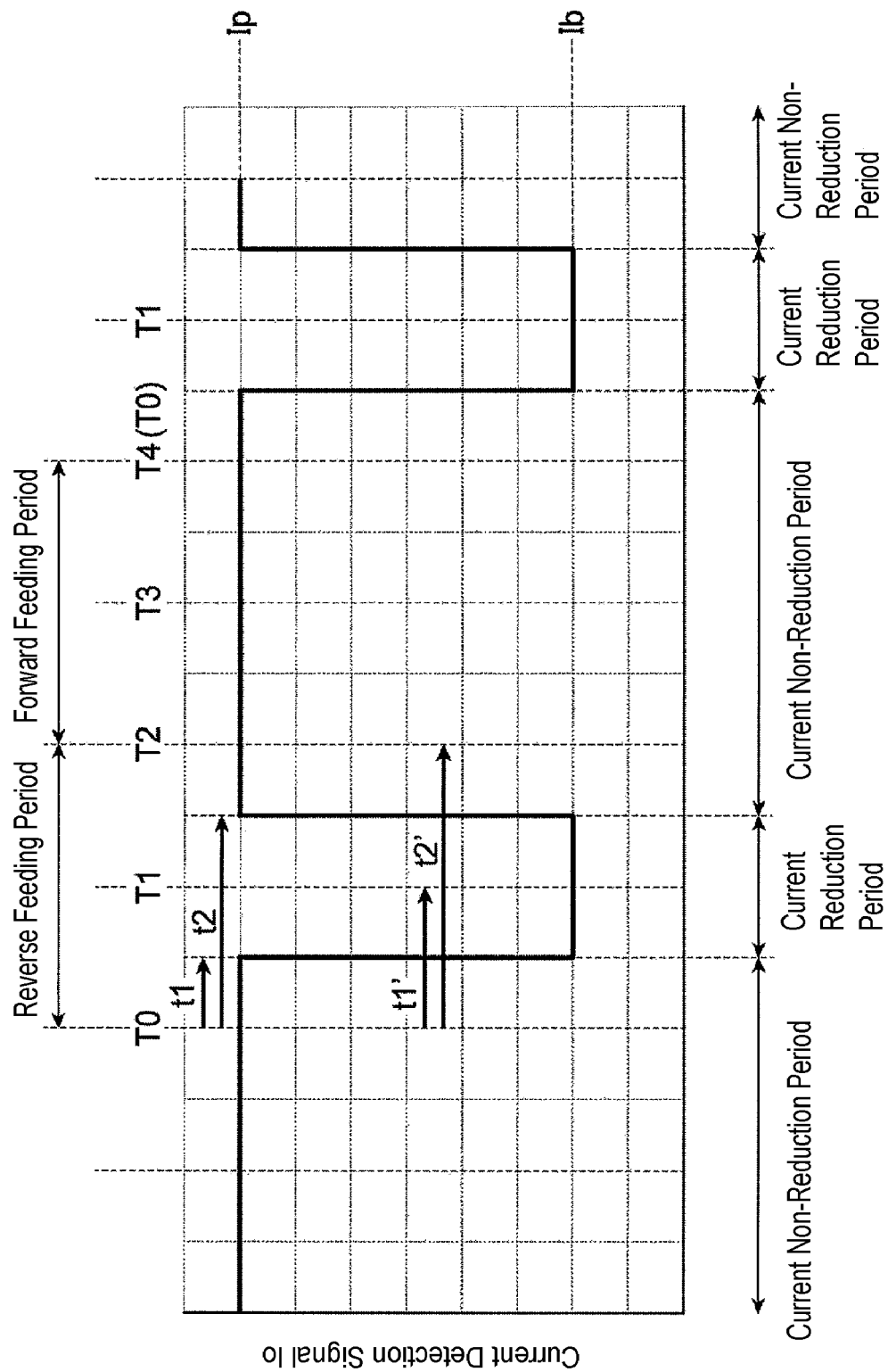
FIG. 6 is a timing chart showing an example of control of a current setting signal for designating a current value of a welding current.

FIG. 6 is a timing chart showing an example of control of the current setting signal Ir for designating a current value of a welding current. The horizontal axis represents time, and the vertical axis represents the current detection signal Io. Time points T0, T1, T2, T3, and T4 in the drawing correspond to the time points T0, T1, T2, T3, and T4 in FIG. 4, respectively. The time points T0, T1, T2, T3, and T4 herein are determined based on the position of the distal end of the welding wire 100 calculated from the average feeding speed Fave and the feeding speed command signal Fw.

As shown in FIG. 6, the base current start time t1 represents a phase delayed from the time point T0 at which the distal end of the welding wire 100 is positioned at the lowermost point, that is, a time point at which the forward feeding period is switched to the reverse feeding period. In FIG. 6, the maximum value of the base current start time t1 is represented by t1'.

Return to the description of FIG. 5.

When the position of the distal end of the welding wire 100 is the lowermost point corresponding to the time point T0, the current setting unit 36 determines whether the time T which is a time elapsed from the time point T0 at which the measurement is started is equal to or longer than the base current start time t1 (step 2).

While the determination result of step 2 is negative (False), the current setting unit 36 outputs the peak current Ip as the current setting signal Ir (step 3).

This period corresponds to the current non-reduction period shown in FIG. 6.

A supply period of the peak current Ip immediately before switching the peak current Ip to the base current Ib is a period during which the melting of the welding wire 100 caused by the peak current Ip proceeds and droplets formed at the distal end of the welding wire 100 grow largely. In addition, the supply period is also a period during which the position of the distal end of the welding wire 100 approaches the surface of the base metal. This period is also a period during which a short circuit is likely to occur and spatter due to the short circuit is likely to occur.

Therefore, in the present embodiment, the peak current Ip is applied until the time t1 elapses, and the occurrence of a short circuit is prevented or avoided. In other words, the supply of the welding current is controlled so as not to cause a short circuit.

In the case of the present embodiment, a preferable range of the peak current Ip is 300 A to 650 A. A preferable range of the base current Ib is 10 A to 250 A.

In the period during which a short circuit may occur, the peak current Ip is desired to be supplied even after the reverse feeding period starts. This period is approximately between the time points T0 to T1. In other words, this period is a period during which the position of the distal end of the welding wire 100 reaches a position defined by ½ of the wave height from the lowermost point of the variation range. Therefore, it is desirable that the end of the period (current non-reduction period) during which the peak current Ip is supplied is performed between the time points T0 to T1. That is, at the time point T0 and a time point near the time point T0, a state of a so-called "buried arc", in which droplets at the wire distal end are positioned in a molten pool extruded by a force of an arc so as to be surrounded, is formed, and a situation in which a short circuit is likely to occur is formed. Therefore, the end of the period during which the peak current Ip is supplied is implemented between time points T0 and T1, so that the action of pushing down the surface of the molten pool due to the arc and the action of lifting the droplets can be maintained and the occurrence of a short circuit during the "buried arc" can be prevented.

Therefore, it is desirable to set the time t1 such that the switching to the base current Ib is executed at a time point slightly after the time point T0 at which the distal end of the welding wire 100 is positioned at the lowermost point, for example, at a time point of about $\pi/18$ to $\pi/3$ (10° to 60°) starting from the time point T0.

Return to the description of FIG. 5.

When the determination result of step 2 is affirmative (True), the current setting unit 36 starts outputting the base current Ib as the current setting signal Ir (step 4). As described above, at the time point at which the switching to the base current Ib is started, the feeding of the welding wire 100 has already been switched to the reverse feeding period, and the distal end of the welding wire 100 starts to move in a direction away from the surface of the base metal.

When the peak current Ip is large, droplets that separate from the distal end of the welding wire 100 vary depending on a transfer mode changing depending on shielding gas applied or current range. For example, in the case of the globular transfer, the droplets are formed in a shape of a large particle having a diameter larger than a diameter of the welding wire 100, and in the case of the spray transfer, the droplets are formed in a shape of a small particle.

In a case where the carbon dioxide gas is used as the shielding gas, an arc is tightened, and an arc reaction force is concentrated on bottom portions of the droplets facing a surface of the molten pool. Therefore, a force to lift the droplets increases, resulting in the globular transfer. In addition, in a case where argon gas or a gas having a high mixing ratio of argon is used as the shielding gas, spray transfer is performed.

The arc length is reduced since droplets at the time point near the time point T0 at which the distal end of the welding wire 100 is positioned at the lowermost point are positioned in a vicinity of the molten pool. Further, after the time point T0, the forward feeding period is switched to the reverse feeding period. That is, the distal end of the welding wire 100 moves in a manner of being pulled up. An inertial force in a forward feeding direction that is a direction approaching the base metal 200 (see FIG. 2) acts on the entire grown droplets, whereas the welding wire 100 moves in a direction away from the base metal 200, which is a reverse direction of the forward feeding direction. Therefore, the droplets change to a more suspended shape, further promoting separation.

In addition, the current value of the welding current is switched to the base current Ib during a period during which the separation is predicted, so that the arc reaction force can be reduced as compared with that in the period during which the peak current Ip is supplied. As a result, the force to lift the droplets is further weakened, and the droplets are more likely to have a suspended shape.

During the period of T0 to T1, the "buried arc" state in which the droplets at the wire distal end are buried in the molten pool is formed as described above, and therefore, a shear force due to pinch force and the like acts greatly on the droplets, and separation is further promoted.

In this manner, the droplets are separated from the distal end of the welding wire 100 during the period during which the welding current is reduced (current reduction period), so that reduction of the spatter generation can be expected.

Return to the description of FIG. 5.

The current setting unit 36 (see FIG. 2) that has switched the current setting signal Ir to the base current Ib determines whether the time T is equal to or longer than the base current end time t2 (step 5). In FIG. 6, the maximum value of the base current end time t2 is indicated by t2'.

When the determination result of step 5 is negative (False), the current setting unit 36 outputs the base current Ib as the current setting signal Ir (step 4).

After the supply of the base current Ib is started, the distal end of the welding wire 100 is moved to be pulled up to the vertex, that is, a position where the distal end is farthest from the base metal 200 while the droplets are separated.

After the separation of the droplets, in order to melt the welding wire 100 to form the droplets, it is necessary to end the supply period of the base current Ib (current reduction period) and switch the supply period of the base current Ib to the supply period of the peak current Ip (current non-reduction period).

Therefore, it is desirable that the supply of the base current Ib is ended between the time points T1 and T2.

On the other hand, when the switching from the base current Ib to the peak current Ip is too early, there are problems that the growth of droplets becomes excessive, a short circuit is likely to occur at the time point at which the welding wire 100 is positioned at the lowermost point, enlarged droplets are lifted too much, and the enlarged droplets are less likely to be separated.

Therefore, it is more preferable that a period of the end of the supply period of the base current Ib, that is, the base current end time t2 is a period from $2\pi/3$ to $\pi$ (120° to 180°).

When the determination result of step 5 is affirmative (True), the current setting unit 36 starts outputting the peak current Ip as the current setting signal Ir (step 6).

Subsequently, the current setting unit 36 determines whether the time T which is a time elapsed from the time point T0 at which the measurement is started reaches the time point T4 (step 7).

When the determination result of step 7 is negative (False), the current setting unit 36 outputs the peak current Ip as the current setting signal Ir (step 6).

On the other hand, when the determination result of step 7 is affirmative (True), the current setting unit 36 returns to step 1.

By the above control, the current setting signal Ir is a pulse waveform in which the peak current Ip and the base current Ib are periodically repeated.

FIG. 7 is an illustrative diagram showing features of a control method for changing a welding current based on a position of a distal end of the welding wire 100.

The example of the related art shown in FIG. 7 corresponds to a method adopted in amplitude feeding represented by Patent Literature 1, specifically, a method of changing an energization period with reference to a phase of a feeding speed.

A suitable transfer mode is a transfer mode other than short-circuit transfer, such as globular transfer or spray transfer in the case of the present embodiment, whereas the example of the related art uses the short-circuit transfer. Therefore, in the method of the embodiment, it is possible to perform welding with a higher heat input and a higher performance rate than the example of the related art. Further, an appearance of a formed bead becomes flat in the case of the present embodiment, whereas an appearance of a formed bead in the example of the related art using the mode of short-circuit transfer has a convex shape.

Further, the penetration depth is large and the welding amount is also large in the case of the present embodiment, whereas the penetration depth is small and the welding amount is also small in the example of the related art, and these are differences between the present embodiment and the example of the related art.

Due to this difference in properties, the example of the related art is applied for arc welding of a thin plate having a thickness of about 9 mm or less, whereas the method in the present embodiment is applied for arc welding of a medium thickness plate having a thickness of about 9 mm or more.

<Relation Between Timing of Separation of Droplets and Control>

The control of the welding current shown in FIG. 5 is performed based on the premise that the droplets are separated from the distal end of the welding wire 100 during the period during which the base current Ib is supplied (current reduction period). However, in actual welding, it is necessary to consider the possibility that the expected separation will not occur.

The separation of the droplets is detected by the separation detector 33 (see FIG. 2), and the separation detection signal Dr1 is output to the current setting unit 36 (see FIG. 2) and the feeding speed command setting unit 22 (see FIG. 2).

In a case where the separation of droplets is not detected within the predetermined period, the feeding speed command setting unit 22 in the present embodiment switches the control of the feeding speed of the welding wire 100 from the control based on the feeding speed command signal Fw to the control based on a constant speed, and sets the current setting signal Ir to the steady current Ia. A speed switching signal SW is used for the control of the feeding speed herein.

Hereinafter, a period during which the welding wire 100 is fed at a constant speed is referred to as a constant-speed feeding period. A welding current during the constant-speed feeding period is set to the steady current Ia flowing under the constant voltage control.

That is, in a case where the separation of the droplets is not performed within the assumed period, the feeding of the welding wire 100 is switched from the amplitude feeding to the constant speed feeding, and the welding current is switched to the steady current Ia.

For example, in a case where the separation of the droplets is not detected at a time point that reaches the time point T2 or in the period from the time point T0 to the time point T2, that is, in the reverse feeding period, the feeding speed command setting unit 22 switches the control from the amplitude feeding period to the constant-speed feeding period.

In a case where the separation of the droplets is detected during the constant-speed feeding period, the feeding speed command setting unit 22 returns the control to the amplitude feeding period. Here, the control returns from the time point T1.

Even if the separation of the droplets is detected, the separation may occur during an unexpected period. For example, in a case where the separation of the droplets is detected during the period from the time point T3 to the time point T4, that is, during the period from a time point at which the feeding speed of the welding wire 100 is maximum to a time point at which the reverse feeding is started, the feeding speed command setting unit 22 switches the control from the time point T4 to the constant-speed feeding period.

That is, the feeding of the welding wire 100 is switched from the amplitude feeding to the constant speed feeding, and the welding current is switched to the steady current Ia.

In a case where the separation of the droplets is detected during the constant-speed feeding period, the feeding speed command setting unit 22 returns the control to the amplitude feeding. Here, the feeding control returns from the time point T1.

FIG. 8 is an illustrative diagram showing a relation between transitions of events in a case where there is a separation and a case where there is no separation.

In FIG. 8, an early period (time points T0 to T1) of the reverse feeding period is expressed as a state A, a later period (time points T1 to T2) of the reverse feeding period is expressed as a state B, an early period (time points T2 to T3) of the forward feeding period is expressed as a state C, a later period (time points T3 to T4) of the forward feeding period is expressed as a state D, and a constant-speed feeding period is expressed as a state E.

In the state A, the control of the feeding speed command setting unit 22 transfers to the state B regardless of whether or not separation of the droplets is detected.

In the state B, the control of the feeding speed command setting unit 22 transfers to the state C in a case where separation of the droplets is detected, and the control of the feeding speed command setting unit 22 transfers to the state E that is the constant-speed feeding period in a case where separation of the droplets is not detected.

In the state C, the control of the feeding speed command setting unit 22 transfers to the state D regardless of whether or not separation of the droplets is detected.

In the state D, the control of the feeding speed command setting unit 22 transfers to the state E that is the constant-speed feeding period in a case where separation of the droplets is detected, and the control of the current setting unit 36 transfers to the state A in a case where separation of the droplets is not detected.

In the state E, the control of the feeding speed command setting unit 22 transfers to the state B in a case where separation of the droplets is detected, and the control of the feeding speed command setting unit 22 is maintained in a case where separation of the droplets is not detected.

The switching of the feeding control may be performed by the feeding drive unit 23 instead of the feeding speed command setting unit 22.

Other Embodiments

Although the embodiment of the present invention is described above, the technical scope of the present invention is not limited to the scope described in the above embodiment. It is apparent from the description of the claims that various modifications or improvements added to the above-described embodiment are also included in the technical scope of the present invention.

For example, both the feeding drive unit 23 (see FIG. 2) and the current setting unit 36 (see FIG. 2) are installed in the welding power source 150 (see FIG. 2) in the above description of the embodiment, but both of them or one of them may be installed in the robot controller 160 (see FIG. 1) or the feeding device 130.

For example, both the feeding drive unit 23 and the current setting unit 36 may be installed in the robot controller 160. Both the feeding drive unit 23 and the current setting unit 36 may be installed in the feeding device 130. The feeding drive unit 23 is installed in the welding power source 150, and the current setting unit 36 may be installed in the robot controller 160 or the feeding device 130. The feeding drive unit 23 may be installed in the robot controller 160, and the current setting unit 36 may be installed in the feeding device 130.

The current reduction period setting unit 36A and the wire distal end position conversion unit 36B are provided inside the current setting unit 36 in the above-described embodiment, but each unit may be provided separately from the current setting unit 36 as an independent functional part. In this case, the functional parts extracted to the outside of the current setting unit 36 as independent functional parts may be installed in the robot controller 160 or the feeding device 130.

The current setting signal Ir (see FIG. 6) is defined as a rectangular wave defined by two values, i.e., the peak current Ip and the base current Ib in the above-described embodiment, but in order to prevent excessive growth of droplets, the transition from the base current Ib to the peak current Ip may have a stepwise shape, may be an upward slope, or may be a curved slope. Similarly, the transition from the peak current Ip to the base current Ib may have a stepwise shape, may be a downward slope, or may be a curved slope.

Figure 9:
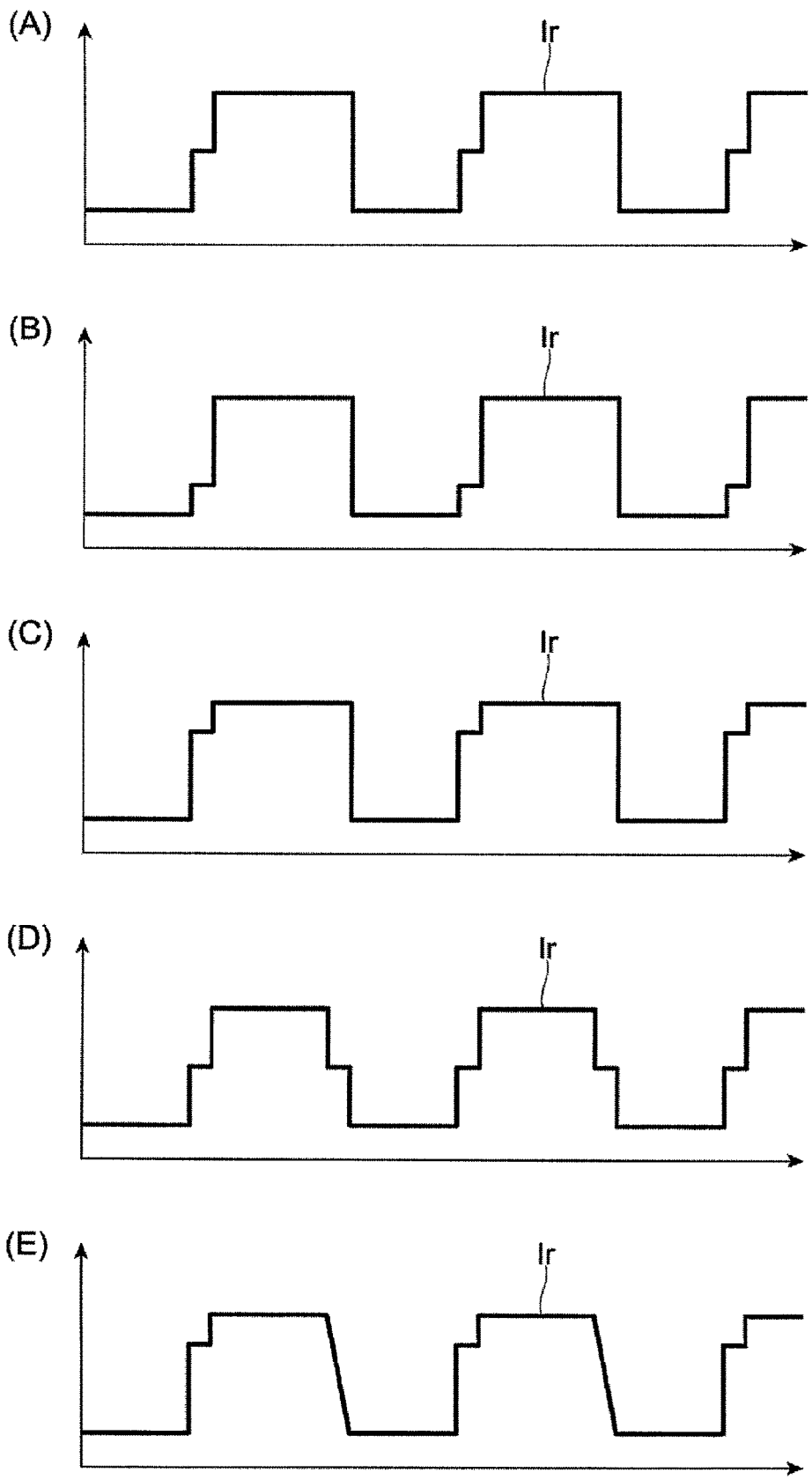
FIG. 9 is a waveform diagram showing a waveform of a current setting signal in a modification. (A) to (C) show cases where transition is performed with a rising waveform being a stepwise shape, (D) shows a case where transition is performed with a rising waveform being a stepwise shape and a falling waveform being a stepwise shape, (E) shows a case where transition is performed with a rising waveform being a stepwise shape and a falling waveform being a downward slope.
Figure 10:
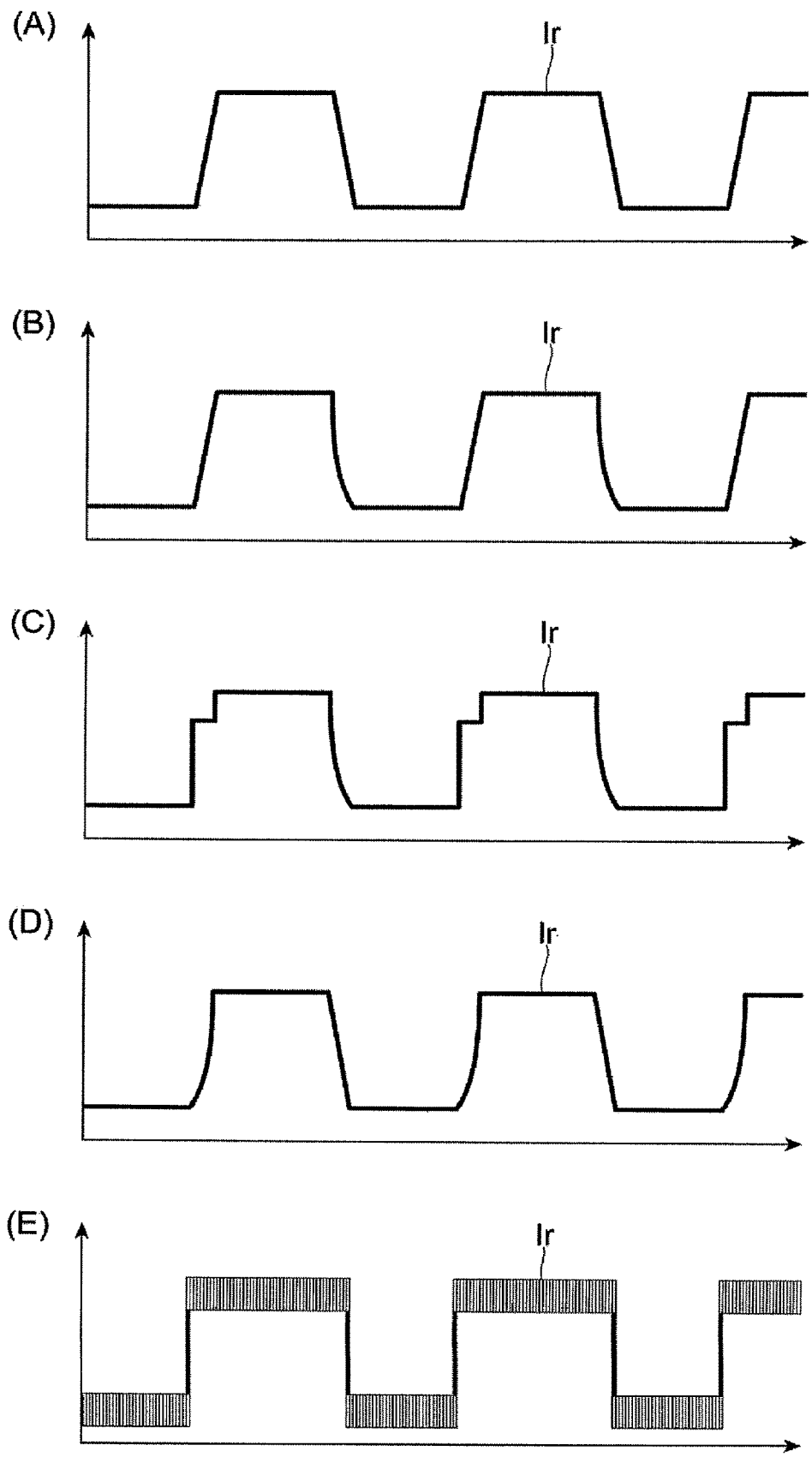
FIG. 10 is a waveform diagram showing a waveform of a current setting signal in another modification. (A) shows a case where transition is performed with a rising waveform being an upward slope and a falling waveform being a downward slope, (B) shows a case where transition is performed with a rising waveform being an upward slope and a falling waveform being a curved slope, (C) shows a case where transition is performed with a rising waveform being a stepwise shape and a falling waveform being a curved slope, (D) shows a case where transition is performed with a rising waveform being an inclined slope and a falling waveform being a downward slope, and (E) shows a case where frequency components are superimposed.

FIG. 9 and FIG. 10 show modifications of the current setting signal Ir. In FIG. 9 and FIG. 10, a rising transition period is provided between an end point of the current reduction period (second period) and a start point of the current non-reduction period (first period), and a falling transition period is provided between an end point of the current non-reduction period (first period) and a start point of the current reduction period (second period).

FIG. 9 is a waveform diagram showing a waveform of a current setting signal Ir in a modification. (A) to (C) show the cases where transition is performed with a rising waveform being a stepwise shape, (D) shows the case where transition is performed with a rising waveform and falling waveform, both being a stepwise shape, (E) shows the case where transition is performed with a rising waveform being a stepwise shape and a falling waveform being a downward slope.

The number of steps of the stepwise shape is two in FIG. 9, and may be three or more.

Note that (A) is an example in which a variation in a first step is equal to a variation in a second step, (B) is an example in which a variation in a first step is small and a variation in a second step is large, and (C) is an example in which a variation in a first step is large and a variation in a second step is small.

FIG. 10 is a waveform diagram showing a waveform of a current setting signal Ir in another modification. (A) shows the case where transition is performed with a rising waveform being an upward slope and a falling waveform being a downward slope, (B) shows the case where transition is performed with a rising waveform being an upward slope and a falling waveform being a curved slope, (C) shows the case where transition is performed with a rising waveform being a stepwise shape and a falling waveform being a curved slope, (D) shows the case where transition is performed with a rising waveform being an inclined slope and a falling waveform being a downward slope, and (E) shows the case where frequency components are superimposed.

Also in the case of FIG. 10, the number of steps of the stepwise shape is not limited to two. In addition, both the rising waveform and the falling waveform may be a cured slope.

The welding current is controlled by a DC constant voltage (see FIG. 2) in the above-described embodiment, but the welding current may be controlled by a predetermined constant current.

The present application is based on Japanese Patent Application No. 2018-180184 filed on Sep. 26, 2018, the contents of which are incorporated herein by reference.

REFERENCE SIGNS LIST

1 Arc welding system
23 Feeding drive unit
33 Separation detector
36 Current setting unit
36A Current reduction period setting unit
36B Wire distal end position conversion unit
100 Consumable electrode (welding wire)
110 Welding torch
120 Welding robot
130 Feeding device
140 Shielding gas supply device
150 Welding power source
160 Robot controller
200 Base metal

The invention claimed is:

1. A welding power source configured to supply a welding current to a wire as a consumable electrode, the welding power source comprising:
    a controller configured to change the welding current based on a position of a distal end of the wire a distance from which to a surface of a base metal varies periodically, in a case where the distal end of the wire is fed toward the base metal with periodical switching between a forward feeding period and a reverse feeding period, wherein
    the controller is further configured to determine the position of the distal end of the wire based on a command value of a feeding speed of the wire.

2. The welding power source according to claim 1, wherein in a case where the position of the distal end of the wire that varies periodically is between a position defined by ½ of a wave height defined by an upper point and a lower point of a variation range and a position closer to the base metal than the position defined by ½ of the wave height, the controller is further configured to start a low-current period during which the welding current is lower than a predetermined current value.

3. The welding power source according to claim 2, wherein the low-current period is started within a range that is from a position of the distal end of the wire at a time point at which a period during which the distal end of the wire is fed forward is switched to a period during which the distal end of the wire is fed reversely to a position of the distal end of the wire at a time point at which a command value of a feeding speed of the wire switched to the reverse feeding becomes maximum.

4. The welding power source according to claim 2, wherein the low-current period is started within a range that is from a point where the distal end of the wire is positioned at a lowermost point of the variation range to a point where a position of the distal end of the wire reaches the position defined by ½ of the wave height.

5. The welding power source according to claim 2, wherein the low-current period is ended within a range that is from a position of the distal end of the wire at a time point at which a command value of a feeding speed of the wire switched to the reverse feeding becomes maximum to a position of the distal end of the wire at a time point at which a period during which the distal end of the wire is fed reversely is switched to a period during which the distal end of the wire is fed forward.

6. The welding power source according to claim 2, wherein the low-current period is ended within a range that is from a point where the distal end of the wire is positioned at the position defined by ½ of the wave height to a point where a position of the distal end of the wire reaches an uppermost point of the variation range.

7. The welding power source according to claim 3, wherein a timing of the start of the low-current period is corrected based on a phase difference between the command value of the feeding speed of the wire and an actually measured feeding speed of the wire.

8. The welding power source according to claim 5, wherein a timing of the end of the low-current period is corrected based on a phase difference between the command value of the feeding speed of the wire and an actually measured feeding speed of the wire.

9. The welding power source according to claim 1, wherein
the welding current has a pulse waveform in which a first period during which a current larger than an average value thereof flows and a second period during which a current smaller than the average value flows are periodically repeated, and
a low-current period corresponds to the second period, and a period other than the low-current period corresponds to the first period.

10. The welding power source according to claim 9, wherein
a rising transition period is provided between an end point of the second period and a start point of the first period, and
a falling transition period is provided between an end point of the first period and a start point of the second period.

11. The welding power source according to claim 10, wherein the welding current in the rising transition period changes stepwise.

12. The welding power source according to claim 1, further comprising a detector configured to detect separation of the wire from the base metal, wherein
in a case where the separation of the wire is not detected by the detector during a period during which the distal end of the wire is fed reversely, the controller is further configured to start control to cause the wire to be fed forward at a predetermined constant speed after an end of the period during which the distal end of the wire is fed reversely, and in a case where the separation of the wire is detected by the detector during a period during which the distal end of the wire is fed forward at a constant speed, the controller is further configured to switch control to an initial condition in which the period during which the distal end of the wire is fed forward and the period during which the distal end of the wire is fed reversely are periodically repeated.

13. The welding power source according to claim 1, further comprising a detector configured to detect separation of the wire from the base metal, wherein
in a case where the separation of the wire is detected by the detector during a period from a time point, at which a command value of a feeding speed of the wire becomes maximum, in a period during which the distal end of the wire is fed forward to a time point of switching to a period during which the distal end of the wire is fed reversely, the controller is further configured to start control to cause the wire to be fed forward at a predetermined constant speed at a time point at which the period during which the distal end of the wire is fed reversely is switched to the period during which the distal end of the wire is fed forward, and
in a case where the separation of the wire is detected by the detector during a period during which the wire is fed forward at a constant speed, the controller is further configured to switch control to an initial condition in which the period during which the distal end of the wire is fed forward and the period during which the distal end of the wire is fed reversely are periodically repeated.

14. A welding system configured to supply a welding current to a wire as a consumable electrode to perform arc welding, the welding system comprising:
a controller configured to change the welding current based on a position of a distal end of the wire a distance from which to a surface of a base metal varies periodically, in a case where the distal end of the wire is fed toward the base metal with periodic switching between a forward feeding period and a reverse feeding period, wherein
the controller is further configured to determine the position of the distal end of the wire based on a command value of a feeding speed of the wire.

15. A method for controlling a welding power source configured to supply a welding current to a wire as a consumable electrode, the method comprising:
changing the welding current based on a position of a distal end of the wire a distance from which to a surface of a base metal varies periodically, in a case where the distal end of the wire is fed toward the base metal with periodic switching between a forward feeding period and a reverse feeding period, wherein
the method further comprises determining the position of the distal end of the wire based on a command value of a feeding speed of the wire.

16. A computer program product comprising a non-transitory computer readable storage medium having instructions encoded thereon that, when executed by a computer in a welding system configured to supply a welding current to a wire as a consumable electrode to perform arc welding, causes the computer to perform an operation of:
changing the welding current based on a position of a distal end of the wire a distance from which to a surface of a base metal varies periodically, in a case where the distal end of the wire is fed toward the base metal with periodic switching between a forward feeding period and a reverse feeding period, and determining the position of the distal end of the wire based on a command value of a feeding speed of the wire.

* * * * *